Oct. 23, 1956   J. H. McLEOD   2,767,482
OPTICAL TESTER FOR THREAD DRUNKENNESS
Filed Sept. 30, 1954   2 Sheets-Sheet 1
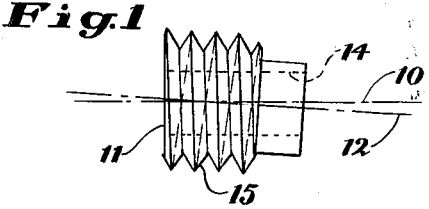
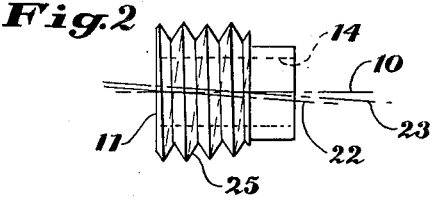
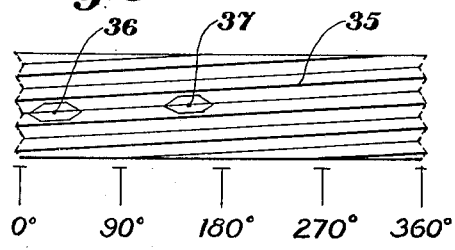
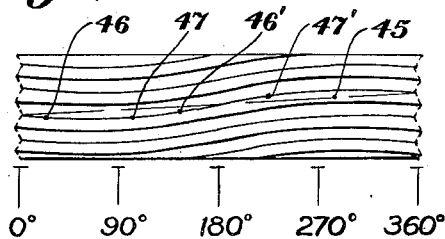
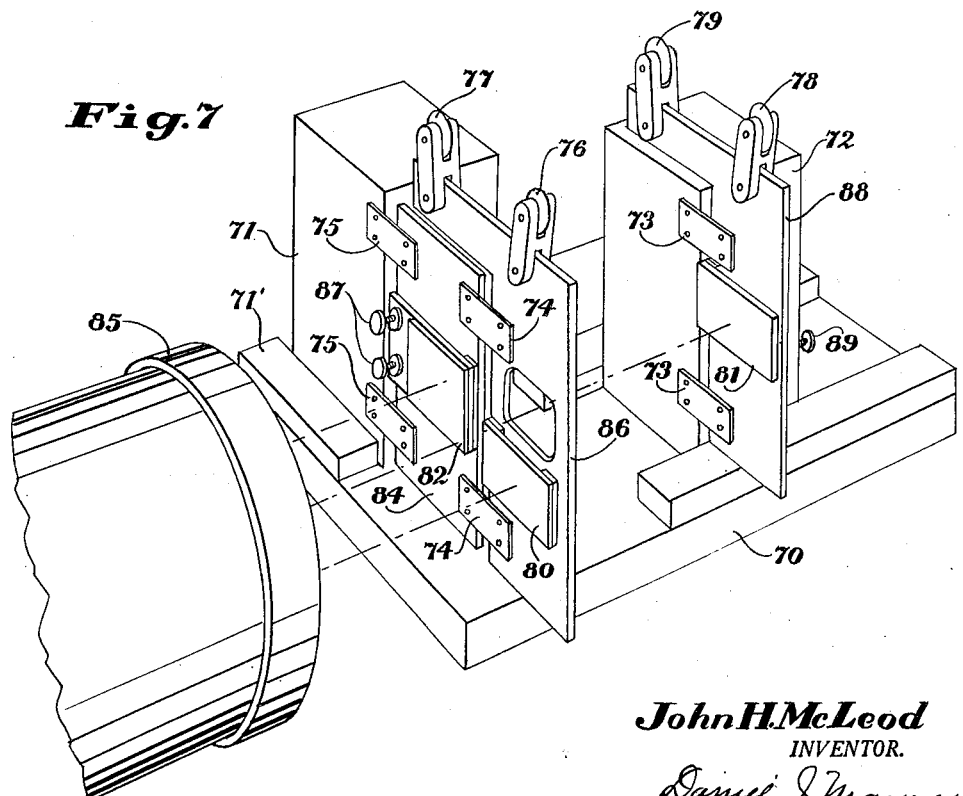
John H. McLeod
INVENTOR.

Oct. 23, 1956  J. H. McLEOD  2,767,482
OPTICAL TESTER FOR THREAD DRUNKENNESS
Filed Sept. 30, 1954  2 Sheets-Sheet 2
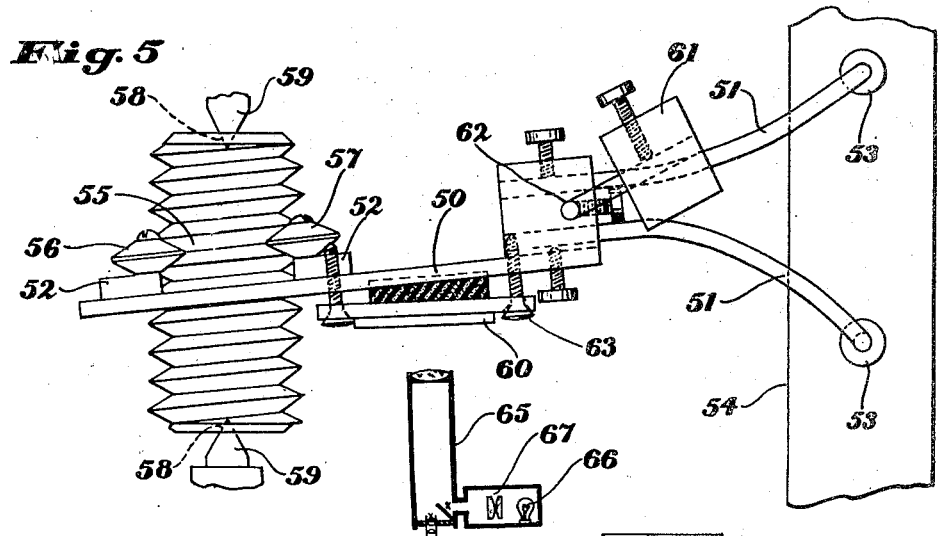
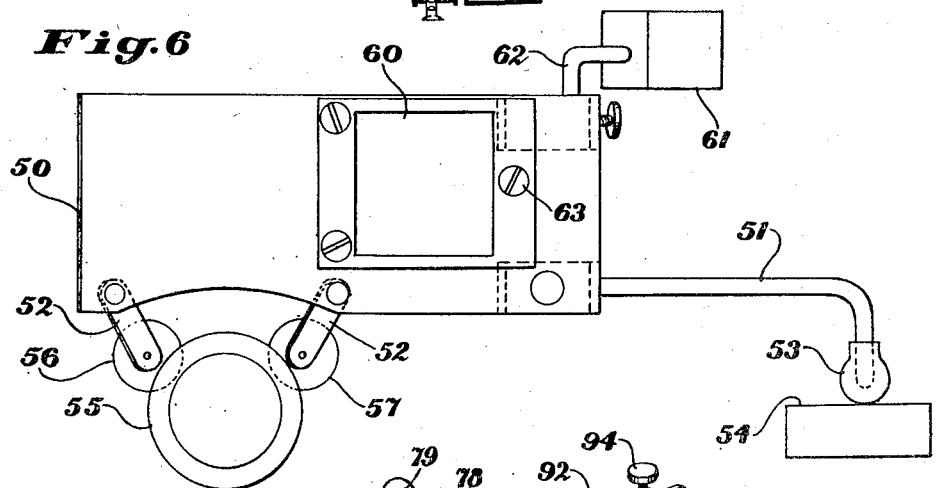
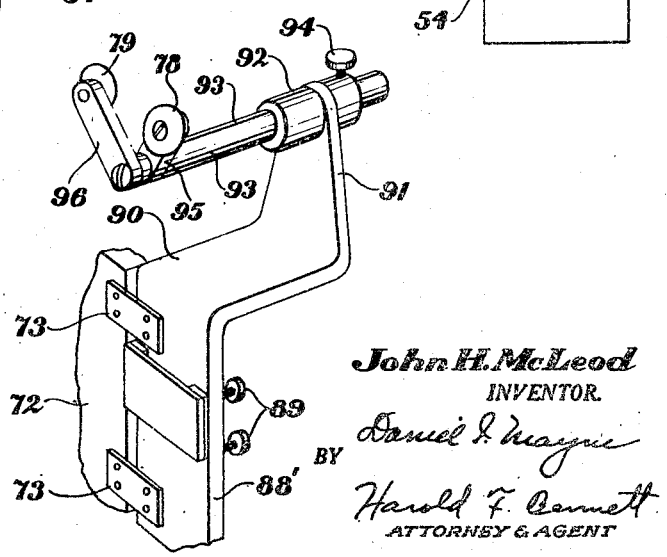
John H. McLeod
INVENTOR.

United States Patent Office 2,767,482
Patented Oct. 23, 1956

2,767,482

OPTICAL TESTER FOR THREAD DRUNKENNESS

John H. McLeod, Rochester, N. Y., assignor to Eastman Kodak Company, Rochester, N. Y., a corporation of New Jersey Application September 30, 1954, Serial No. 459,370

4 Claims. (Cl. 33—199)

This invention relates to thread gauges and particularly to gauges for measuring the drunkenness of threads or the angular deviation of the axis of the threads from some axis of reference.

The object of the invention is to provide a tool for measuring irregularities in a threaded part, particularly drunkenness and angular deviation of the axis of the threads from a reference axis and to measure these errors with extreme accuracy.

It is an object of a preferred form of the invention to provide apparatus for measuring the errors in a threaded part so as to distinguish between drunkenness and the angular deviation of the axis of the threads from a reference axis and to distinguish these from other types of thread irregularities.

It is a particular object of the invention to provide means for measuring the accuracy of threads intended for use in the mounting of optical parts such as the components of a compound lens.

It is an ancillary object of the invention to provide optical apparatus for measuring the characteristics of threads.

Many types of thread gauges are known ranging from simple mating gauges for distinguishing between different standard types of threads to gauges which measure the pitch diameter or which measure the perpendicularity of a shoulder on the piece with respect to the axis of the threads, but none of the gauges heretofore known provide means sufficiently accurate for checking each individual turn of the threaded part with the accuracy required for threads used in mounting optical parts such as the component parts of a compound lens.

According to the present invention, apparatus is provided for measuring the drunkenness of the individual turns of the thread of a threaded part, consisting of means for supporting a threaded part for rotation around an axis, means for contacting the thread substantially at its pitch circle at two points less than 180° apart, means for preventing the movement of the two contact points around the threaded part while permitting longitudinal movement almost without external friction, and optical means for magnifying the angular tilting movement with respect to the axis of reference so as to detect and measure irregularities in the individual threads.

In one form of the invention the threaded part is mounted for rotation about an axis of reference and the apparatus is made up in the form of a tripod, one foot of the tripod being formed by two contact points contacting the thread under test and the other feet of the tripod resting on a flat guide plane and being free to slide on this guide plane with very little friction, the guide plane being substantially radial with respect to the axis of rotation of the threaded part. The apparatus is held against the threaded part and against the guide plane by gravity and preferably by an adjustable weight.

Each of the two contact points which contact the threaded part is preferably made up in the form of a disc with edges which taper at the same angle as the taper of the sides of the groove in the screw thread, and the extreme edge of the disc may be slightly blunted if desired particularly if it is not required to detect dirt or burrs in the extreme bottom of the thread groove.

An optical lever of some known type is provided, preferably by mounting a plane mirror in a fixed relationship to the two contact points, either perpendicular to the line connecting the two contact points or perpendicular to the axis of rotation of the threaded part or at some angular position between these two positions. An autocollimating telescope is provided, preferably with a micrometer eyepiece, for throwing collimated light perpendicularly onto the mirror and focusing the reflected rays into the focal plane of the eyepiece for measuring very accurately the angular tilt of the mirror due to drunkenness of the threads. Since the mirror moves in collimated light, its movement along the length of the screw does not throw the scale out of focus. This is true whether the collimator is parallel to the axis of rotation or perpendicular to it.

According to the preferred form of the invention which is intended for measuring thread drunkenness independently of tilt of the thread axis, two pairs of discs are provided spaced a distance apart so that the threaded piece can rest on the four discs whereby the axis of the threads is located relative to the four discs independently of any axis of reference established by a bore shoulder or cylindrical surface on the same part. These four discs are ordinarily located at the corners of a parallelogram in a horizontal plane to form the cradle in which the thread rides so that when the thread is turned, it is constrained to rotate only about its own axis. Both pairs of discs are mounted on firm supports by hinges to allow the pairs of discs to align themselves to the angle of the thread. The hinges are preferably of the reed spring or flexure type to give maximum stiffness in one plane and smooth bending in the other and preferably they are located on the vertical center lines between the discs of the respective pairs. This is desirable from the point of view of rigidity and balance. The distance between the pairs of discs is adjustable by moving one of the supports to accommodate threads of different lengths. Also a second pair of hinges is provided on one of the pairs of discs between the first mentioned pair of hinges and the support to allow the distance between the pairs of discs to be automatically adjusted by a small amount to fit the pitch of the thread after the distance is roughly adjusted by hand.

Also the distance between the individual discs of each pair is preferably adjustable for different size threads.

As in the previously described form of the invention, a mirror is mounted on one of the pairs of discs and used in conjunction with an autofocusing collimator and micrometer eyepiece for measuring the drunkenness of the threads. Optionally a mirror is mounted on the other pair of discs for measuring variations in the drunkenness along the length of the screw and also optionally a mirror is mounted between the first and second mentioned hinges supporting one of the pairs of discs to measure variations in pitch of the screw thread. These optional measurements are not the principal object of the invention but may be useful in some cases. If used, a finer adjustment should be provided on the optional mirrors so that they can be made parallel to the first mentioned mirror, whereupon the reflections from two or all three of the mirrors can be compared in the same eyepiece.

In the accompanying drawings:

Fig. 1 shows a tilted screw thread.

Fig. 2 shows a drunken thread.

Fig. 3 is a developed showing of an accurate thread.

Fig. 4 is a developed showing of a drunken thread.

Fig. 5 is a plan view of one form of the invention.

Fig. 6 is an elevation of Fig. 5.

Fig. 7 is a perspective view of another form of the invention.

Fig. 8 shows a part of Fig. 7 modified for measuring internal threads.

Fig. 1 shows a threaded part in which an end face or shoulder 11 and a bore 14 have a common axis 10, and screw threads 15 have an axis 12 which is tilted at a small angle with respect to the axis 10. It will be noted that each thread taken individually is tilted with respect to the axis of reference 10 so that if a thread follower having substantially point contact with the thread were rotated at a uniform angular speed around the axis 10 its gain, that is its component of movement along the axis 10, would be slower during the 180° visible in Fig. 1 than in the other 180°.

Fig. 2 shows a similar part in which the shoulder 11 and the bore 14 and the pitch cylinder of the threads 25 all have a common axis 10 referred to as the reference axis. The individual turns of the thread, however, are tilted so that they have axes 22, 23 (shown for two of the individual turns) tilted at the same angle as the axis 12 in Fig. 1. Accordingly, a thread follower making substantial point contact with the threads and rotating around the axis 10 at a uniform speed would have slower gain during the half turn visible in Fig. 2 than in the other half in almost exactly the same way as in Fig. 1. The difference would be due to a second order effect due to the fact that the radial distance from the axis 10 to the pitch circle of certain ones of the threads in Fig. 1 changes as the thread contactor moves around the circle. This second order effect is very small and scarcely detectable on short threaded parts. Thus, it is evident that drunkenness and tilt can both be measured in the same way by rotating the threaded part around the reference axis 10.

Fig. 3 is a developed showing of a perfect set of screw threads 35 in which the slope is the same at all parts of the thread. A thread follower making contact at two spots, 36, 37, would always have the same tilt.

Fig. 4 is a similar developed showing of a screw thread which suffers from drunkenness or tilt. The points on the thread at 0° and 180° and, of course, 360° lie on the true or ideal thread line 45 but the threads themselves describe a sine curve with its maximum downward and upward deviation from an ideal at 90° and 270°. In contrast to the constant slope in Fig. 3, a thread follower contacting the thread at the points 46 and 47 in Fig. 4 would have less tilt than the same follower moved to 46' and 47'.

Figs. 3 and 4 may give the deceptive impression that the variation in tilt depends upon the distance between the two points at which the thread follower contacts the thread. This is not true in practice, however, as the actual distance between the points is not measured along the circumference as in Figs. 3 and 4, but along the chord connecting the two points of contact. Furthermore, it may be seen from Fig. 1 or Fig. 2 the two contact points have a fixed tilt with respect to the axis 22 of the individual thread being contacted regardless of the distance between them (so long as it is less than 180°) and that the variation in tilt with respect to the axis of reference 10 is due to the rotation of the thread axis (12 in Fig. 1 or 22, 23 in Fig. 2) around the axis of reference 10. Thus the tilt which is to be measured is independent of the distance between the contacting points of the thread follower.

There are other minor errors which can be detected by a gauge according to the invention, for example if the lead screw of the screw-cutting lathe suffers from drunkenness a variation will show up in the threads which has a regular period generally different from 360°. Also, chatter of the cutting tool shows up as a variation within a very short period. If this period is not a submultiple of the distance between the two contact points, this error can be detected and measured. Although these errors are easily detected and measured, the principal purpose of the gauge is to measure the larger errors due to faulty centering of the piece when it is being threaded.

Figs. 5 and 6 show a simple apparatus for measuring the tilt or drunkenness of threads and comprises a body 50 and two arms 51 which form two legs of a tripod supporting the body of the instrument. The third leg of the tripod is formed by the pair of thread followers 56, 57 which are attached to the body 50 by the adjustable arms 52 and which rest on the screw thread 55. These contacting members are made up in the form of small discs with edges which taper at the same angle as the screw threads so that they fit down into the groove in the thread. The legs 51 are preferably provided with caps 53 of extremely low friction material such as one of the plastics nylon or Teflon and rest on a polished flat 54 so that they slide easily while the thread contacting members 56, 57 find their way into the thread groove. The thread contacting member should not have sharp edges but should be blunted to clear the root of the thread under test and so that small pieces of dirt or burrs in the bottom of the thread groove do not affect the results. The shape chosen, of course, will depend upon the shape of the threads on the part under test. A weight 61 of convenient size is mounted above the body of the instrument for holding the thread contacting members against the threads with sufficient force to prevent errors in the measurements due to these contacting members slipping part way out of the threads. I have found a weight of half a pound to a pound adequate for larger size threads and a smaller weight for finer threads. This weight is mounted on an adjustable stem 62 so that the pressure can be distributed among the three tripod legs in any proportion found suitable. The threaded part under test is mounted in any known manner to be revolved around the axis chosen as the reference axis. The part shown in Fig. 5 is provided with center holes 58 and mounted between standard center points 59 for rotation by hand. The threaded piece can be mounted in threaded chucks, universal chucks or in other ways against its face or shoulder such as 11 in Figs. 1 and 2 or on the center hole 14 in Figs. 1 and 2 or in any other known manner.

When the threaded part 55 is rotated, the largest observable motion of the thread gauge is its movement in the direction of the axis of the threads. Angular movement in the direction of the rotation of the threaded part is prevented by the legs 53 pushing against surface 54 or by the force of the weight 61 holding these legs against the surface. The legs 53 slide along the surface freely to allow movement of the gauge in the axial direction. Any deviation of the slope of the groove of the threads causes a rotation of the body 50 around a line perpendicular to the thread axis and also perpendicular to the line connecting the contact points. A mirror 60 is attached to the body 50 and may if preferred have an adjustment screw 63 for adjusting its angle to a small extent. This mirror is roughly parallel to the line just mentioned about which the body 50 is caused to rotate by irregularities in the screw thread. An auto-collimating telescope 65 of any known type is mounted with its axis substantially perpendicular to the mirror for observing and measuring the tilting of the mirror with respect to the axis of rotation already mentioned. This collimator and a lamp 66 and condenser lens 67 are shown in Fig. 5 at about one-tenth natural size to save space.

Fig. 7 shows a perspective view of another form of the invention for measuring drunkenness of the threads independent of any shoulder or arbitrary axis. Drunkenness, as explained above, is tilt of individual turns of the thread with respect to the axis of the cylinder whose surface passes through the pitch diameter (or diameters in case two portions of the length are threaded to different diameters). Of course, it is assumed that the threaded piece to be measured is not bent. A bent rod is easily detected by rolling it on a flat surface.

Briefly, in Fig. 7, four thread-contacting points 76, 77, 78, 79 are arranged at the corners of a parallelogram and form a bed on which the threaded piece lies and seeks a position at which the axis remains stationary. The four thread-contacting points are mounted as two pairs for contacting two individual threads along the length of the screw. Any drunkenness of the thread contacted causes the pair of contacting points to oscillate about an axis perpendicular to the axis of the thread when the threaded piece is rotated, and the oscillation is measured by an autocollimating telescope 85 as before. Ordinarily it is sufficient to provide one mirror 80 and to measure the oscillation of one pair of contacting points 76, 77. However, in special cases it is advantageous to provide two other mirrors 81 and 82 for special purposes which will be described below. When the part being tested has two threaded sections of different diameters along its length the individual contacting points in the two pairs are separated different distances so that the thread axis is at least approximately horizontal.

Going more into detail, a base 70 is provided on which are mounted two posts 71 and 72 onto which are hinged members supporting the respective pairs of contacting points. The member 88 holding one pair of contacting points 78, 79 is hung on one pair of hinges 73 preferably located on a vertical axis midway between the two points. The member 86 holding the other pair is hung on a similar pair of hinges 74 attached to an intermediate member 84 which in turn is hinged to the corresponding post by a parallel set of hinges 75. The distance between the pairs of thread-contacting points is set approximately by moving the post 72, and exact adjustment to the distance between threads, when the threaded piece (not shown) is laid in position, takes place automatically by flexure of the second pair of hinges 75 at one end. Preferably the hinges are of the flexure type as mentioned before.

A flat mirror 80 is attached to one of the hinged members 86 supporting the contacting points. An autocollimating telescope 85, of which only the objective end is shown, is aligned with the mirror 80 after the piece to be tested is in place, and small oscillations of the mirror while the test piece is being rotated are detected and measured at the eyepiece of the telescope in the known manner.

Optionally, a second mirror 81 is mounted on the other hinged member 88. Conveniently this is viewed through a hole in the hinged member 86. At least one of the two mirrors is provided with adjusting screws 89 for adjusting it into parallelism with the other mirror. Both mirrors may optionally be made adjustable and the collimator fixed in position, but I find it preferable to adjust the collimator into alignment with the one mirror 80 and to adjust the other mirror into alignment with both. By observing the oscillations of both mirrors at once, variations in the thread errors along the length of the test piece can be detected, and particularly in case two sets of threads are threaded onto one piece, a comparison between the two threads is obtained so that, for example, if the two threads are on non-parallel axes the two mirrors tend to oscillate in opposite phase.

Optionally also, a third mirror 82 is mounted on the intermediate hinged member 84 for measuring variations in pitch along the length of the screw. Oscillation of this may be observed separately by moving the collimator 85 over in front of it or, if convenient, all three mirrors are observed at the same time in which case the third mirror 82 is also provided with adjusting screws 87. The reflections from the several mirrors can be made distinguishable when under simultaneous observation, by providing surfaces which reflect different characteristic colors or by interposing color filters.

Thus, although the main object of the testing is achieved by observing the oscillations of the one mirror 80, these other measurements are available when needed.

The forward post 71 may be attached fixedly to the base 70, but I find it preferable to provide some adjustment for the average slope of the screw thread so that when a threaded piece is laid into position on the four thread-contacting points there is a minimum of flexure of the hinges while the contacting points are settling into the thread grooves. It has been found from experience that it is easier to get accurate measurements under these conditions, and the contacting points are less likely to jump out of the thread groove while the threaded piece is being rotated. This adjustment is conveniently provided by making the post 71 adjustable laterally, as indicated by the transverse way 71' or it may be provided in other equivalent ways.

Fig. 8 shows how the apparatus of Fig. 7 is modified for measuring internal threads. Only the hinged member 88' corresponding to member 88 is shown, along with the hinges 73 and a corner of the post 72. The upper end of the member is given roughly a horseshoe shape so that the thread-contacting discs 78 and 79 can be inserted into the hollow of an internally threaded piece of sufficiently large diameter. More specifically, the member 88' is bent so that it has a part 90 set at roughly a right angle to the hinged portion and is bent again so that the third part 91 is parallel with the hinged part. A collar 92 is attached to the third part 91 to support and give stability to a rod 93 which is thus supported substantially parallel to the locus of the axis of the threads when in position to be measured. The two contacting discs 78 and 79 are mounted on radial arms 95, 96 which in turn are adjustably attached to the end of the rod 93. The rod may be adjusted longitudinally, and is held in position by a set screw 94. The other hinged member 86 is similarly modified.

I find it preferable to adjust the rod 93 so that the contacting discs are directly over the hinges as before, although this is not always possible. It can easily be shown that the sensitivity of the instrument decreases when the distance between the two pairs of hinges 73 and 74 is greater than the distance between the two pairs of contacting discs and increases when the former distance is less than the latter. However, in the latter case the instrument tends to become unstable, and in the limiting condition when the two pairs of hinges are coaxial it loses all power of adapting to the pitch of the thread.

Optionally the horseshoe-shaped part is provided below the hinges, in which case, of course, the apparatus is supported from one side or above so that there is suitable working room. This optional form requires a smaller horseshoe when large rings are to be tested.

Optionally, also, a double horseshoe or yoke is provided and one hinge is located above and one below to provide greater stability of the working parts.

Nothing has been said as to whether the contacting discs are rotatable on their axes in the different embodiments of the invention. I prefer to have them non-rotatable to avoid the errors which would be introduced by their rotation because of end-play in the bearings and other unavoidable imperfections. However, when somewhat less precise measurements are satisfactory, the rotation of the discs makes the rotation of the threaded piece under test considerably easier.

I claim:

1. Apparatus for measuring the drunkenness of threads comprising a contacting member adapted to contact a threaded article at two points less than 180° apart along a single thread thereof, means for supporting the threaded article for rotation around a horizontal axis and with the axis of the threads at least approximately coinciding with the axis of rotation, means for maintaining gravity urged contact between the contacting member and the threaded article during rotation of the latter, means for maintaining the points of contact in a horizontal plane, and means for measuring the rotational movements of the contacting member caused by irregularities in the thread when the threaded article is rotated.

2. Apparatus for measuring axial tilt and drunkenness of threads comprising means for supporting a threaded article for rotation around an axis of reference at least approximately coinciding with the axis of the threads, a contacting member adapted to contact the threaded article at two points less than 180° apart along a single thread thereof, means for maintaining the contacting member in contact with the threaded article in said manner, said two points determining a plane parallel to the axis of rotation, means for maintaining the points of contact in said plane, and means for measuring rotational movements of the contacting member due to irregularities in the threads when the threaded article is rotated.

3. Apparatus for measuring the drunkenness of threads comprising two contacting members each adapted to contact a threaded article at two points less than 180° apart along a single thread thereof and the two members together forming a cradle for supporting the article at four points of contact, means for maintaining the contacting members in a horizontal plane, and means for measuring the rotational movements of one of said contacting members due to irregularities in the threads when the threaded article is rotated in said cradle.

4. Apparatus for measuring the tilt of individual turns of the thread of a threaded article comprising means for supporting the threaded article for rotation around an axis of reference, a guide having a plane surface substantially radial with respect to the axis of rotation, a member in the form of a tripod, one foot of the tripod being formed by two contact points adapted to contact the threaded article under test at two points less than 180° apart along a single thread and the other two feet of the tripod being adapted to slide on the guide plane with a minimum of friction for preventing the rotation of said member around the axis of rotation when the threaded article is rotated, means for maintaining contact between the respective feet of the tripod and the threaded article and guide plane respectively, and means for measuring the rotational movements of said tripod due to the tilt of the individual turns of the thread when the threaded article is rotated.

References Cited in the file of this patent

UNITED STATES PATENTS

| | | |
|---|---|---|
| 1,528,314 | Wickman | Mar. 3, 1925 |
| 2,233,626 | McClure | Mar. 4, 1941 |
| 2,444,702 | Johnson | July 6, 1948 |
| 2,662,297 | Reicherter | Dec. 15, 1953 |